(12) United States Patent
Hasegawa

(10) Patent No.: US 11,843,275 B2
(45) Date of Patent: Dec. 12, 2023

(54) IMAGE CAPTURE APPARATUS AND CONTROL METHOD, FOR CONTROLLING VOLTAGE TO BE REQUESTED FROM A POWER SUPPLY BASED ON TEMPERATURE AND/OR POWER CONSUMPTION OF THE IMAGE CAPTURE APPARATUS

(71) Applicant: CANON KABUSHIKI KAISHA, Tokyo (JP)

(72) Inventor: Takashi Hasegawa, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 822 days.

(21) Appl. No.: 16/918,974

(22) Filed: Jul. 1, 2020

(65) Prior Publication Data

US 2020/0335995 A1    Oct. 22, 2020

Related U.S. Application Data

(63) Continuation of application No. PCT/JP2018/048110, filed on Dec. 27, 2018.

(30) Foreign Application Priority Data

Jan. 9, 2018  (JP) ................................ 2018-001403

(51) Int. Cl.
*H02J 7/00* (2006.01)
*G03B 7/26* (2021.01)

(52) U.S. Cl.
CPC .......... *H02J 7/007192* (2020.01); *G03B 7/26* (2013.01); *H02J 7/0029* (2013.01); *H02J 7/00034* (2020.01); *H02J 7/0042* (2013.01); *H02J 7/007182* (2020.01); *G03B 2217/007* (2013.01); *H02J 7/00309* (2020.01); *H02J 2310/22* (2020.01)

(58) Field of Classification Search
CPC ............. H02J 7/007192; H02J 7/00034; H02J 7/0029; H02J 7/0042; H02J 7/007182; H02J 7/00309; H02J 2310/22; G03B 7/26; G03B 2217/007; H04N 23/65; H04N 23/66
See application file for complete search history.

(56) References Cited

U.S. PATENT DOCUMENTS 9,582,012 B2 * 2/2017 Park ........................ G06F 1/203
10,714,964 B2 * 7/2020 Atkinson .................. H02J 7/04
(Continued)

FOREIGN PATENT DOCUMENTS

| JP | 2007-306063 A | 11/2007 |
|---|---|---|
| JP | 2008-259315 A | 10/2008 |

(Continued)

*Primary Examiner* — Chiawei Chen
(74) *Attorney, Agent, or Firm* — Canon U.S.A., Inc. IP Division

(57) ABSTRACT

An image capture apparatus includes a determination unit that determines voltage to be supplied from a power supply apparatus to the image capture apparatus, based on a temperature of the image capture apparatus and power consumption of the image capture apparatus; a communication unit that sends the determined voltage to the power supply apparatus; and a power receiving unit that receives power supplied from the power supply apparatus to the image capture apparatus after the determined voltage is sent to the power supply apparatus.

5 Claims, 6 Drawing Sheets

(56) References Cited

U.S. PATENT DOCUMENTS

| | | | | |
|---|---|---|---|---|
| 11,398,744 B2* | 7/2022 | Sun | ............... | H02J 7/007192 |
| 2004/0145323 A1* | 7/2004 | Maslov | ............... | H02P 25/08 |
| | | | | 318/400.2 |
| 2010/0277128 A1* | 11/2010 | Tam | ............... | H02J 7/007192 |
| | | | | 320/150 |
| 2010/0277130 A1* | 11/2010 | Tsuji | ............... | H02J 7/007192 |
| | | | | 320/152 |
| 2013/0326239 A1* | 12/2013 | Andrews | ............... | G06F 1/3296 |
| | | | | 713/300 |
| 2014/0217958 A1* | 8/2014 | Verdun | ............... | H02J 7/04 |
| | | | | 320/134 |
| 2016/0064962 A1 | 3/2016 | Huang et al. | | |
| 2016/0126762 A1* | 5/2016 | Verdun | ............... | H02J 7/0069 |
| | | | | 320/162 |
| 2017/0229892 A1* | 8/2017 | Kobayashi | ............... | H02J 7/04 |
| 2019/0006873 A1* | 1/2019 | Aurongzeb | ............... | H02J 50/10 |
| 2020/0310508 A1* | 10/2020 | Force | ............... | G06F 1/305 |

FOREIGN PATENT DOCUMENTS

| | | |
|---|---|---|
| JP | 2015-037230 A | 2/2015 |
| JP | 2017-138870 A | 8/2017 |

\* cited by examiner

FIG. 5

| ALLOWABLE CONVERSION LOSS TABLE | | POWER CONSUMPTION OF IMAGE CAPTURE APPARATUS 100 | | |
|---|---|---|---|---|
| | | 5 W | 10 W | 20 W |
| TEMPERATURE MARGIN | -20°C | 20 W | 15 W | 10 W |
| | -15°C | 10 W | 8 W | 5 W |
| | -10°C | 6 W | 4 W | 2 W |
| | -5°C | 4 W | 2 W | 1 W |

FIG. 6

| CONVERSION LOSS TABLE | | POWER CONSUMPTION OF IMAGE CAPTURE APPARATUS 100 | | |
|---|---|---|---|---|
| | | 5 W | 10 W | 20 W |
| SUPPLY VOLTAGE | 5 V | 4.1 W | 8.2 W | 16.4 W |
| | 9 V | 2.7 W | 5.4 W | 10.8 W |
| | 12 V | 1.7 W | 3.3 W | 6.7 W |
| | 20 V | 0.3 W | 0.5 W | 1.1 W |

FIG. 7

| SUPPLY VOLTAGE | SYSTEM VOLTAGE | CONVERSION EFFICIENCY | POWER CONSUMPTION | VOLTAGE CONVERSION LOSS |
|---|---|---|---|---|
| 5W | 16.8W | 55% | 20W | 16.4W |
| 9W | | 65% | | 10.8W |
| 12W | | 75% | | 6.7W |
| 20W | | 95% | | 1.1W |

IMAGE CAPTURE APPARATUS AND CONTROL METHOD, FOR CONTROLLING VOLTAGE TO BE REQUESTED FROM A POWER SUPPLY BASED ON TEMPERATURE AND/OR POWER CONSUMPTION OF THE IMAGE CAPTURE APPARATUS

CROSS-REFERENCE TO RELATED APPLICATIONS

This application is a Continuation of International Patent Application No. PCT/JP2018/048110, filed Dec. 27, 2018, which claims the benefit of Japanese Patent Application No. 2018-001403, filed Jan. 9, 2018, both of which are hereby incorporated by reference herein in their entirety.

BACKGROUND

Field of the Invention

An aspect of the present invention relates to an image capture apparatus and a control method thereof.

Background Art

As one of specifications compliant with USB (Universal Serial Bus) specification, USB Power Delivery (USB PD) specification is known. The USB PD specification enables larger power supply than the USB specification. According to the USB PD specification, an image capture apparatus and a power supply apparatus negotiate on supply voltage and current. The power supply apparatus is capable of supplying power up to 100 W to the image capture apparatus. With the use of the USB PD specification, the image capture apparatus may be driven with power from the power supply apparatus (see Japanese Patent Laid-Open No. 2008-259315).

The temperature of an image capture apparatus increases by converting voltage supplied from a power supply apparatus to system voltage. In the case where voltage supplied from the power supply apparatus is higher than system voltage, the temperature of the image capture apparatus excessively increases, which may stop the operation of the image capture apparatus.

SUMMARY

According to an aspect of the present invention, an image capture apparatus or a control method thereof is capable of appropriately controlling power that the image capture apparatus receives from a power supply apparatus.

According to an aspect of the present invention, an image capture apparatus includes: a determination unit that determines voltage to be supplied from a power supply apparatus to the image capture apparatus, based on a temperature of the image capture apparatus and power consumption of the image capture apparatus; a communication unit that sends the determined voltage to the power supply apparatus; and a power receiving unit that receives power supplied from the power supply apparatus to the image capture apparatus after the determined voltage is sent to the power supply apparatus.

According to an aspect of the present invention, a method includes: determining voltage to be supplied from a power supply apparatus to an image capture apparatus, based on a temperature of the image capture apparatus and power consumption of the image capture apparatus; sending the determined voltage to the power supply apparatus; and receiving power supplied from the power supply apparatus to the image capture apparatus after the determined voltage is sent to the power supply apparatus.

According to an aspect of the present invention, a non-transitory storage medium that stores a program for causing a computer to execute a method is provided, the method including: determining voltage to be supplied from a power supply apparatus to an image capture apparatus, based on a temperature of the image capture apparatus and power consumption of the image capture apparatus; sending the determined voltage to the power supply apparatus; and receiving power supplied from the power supply apparatus to the image capture apparatus after the determined voltage is sent to the power supply apparatus.

Other aspects of the present invention will become apparent from the following embodiments.

BRIEF DESCRIPTION OF DRAWINGS

FIG. 5 is a diagram for illustrating an exemplary allowable conversion loss table.

FIG. 6 is a diagram for illustrating an exemplary conversion loss table.

FIG. 7 is a diagram for illustrating an exemplary efficiency of converting supply voltage to battery voltage.

DESCRIPTION OF THE EMBODIMENTS

Hereinafter, aspects and embodiments of the present invention will be described with reference to the drawings. Note that the aspects of the present invention are not limited to the following embodiments.

First Embodiment

Figure 1:
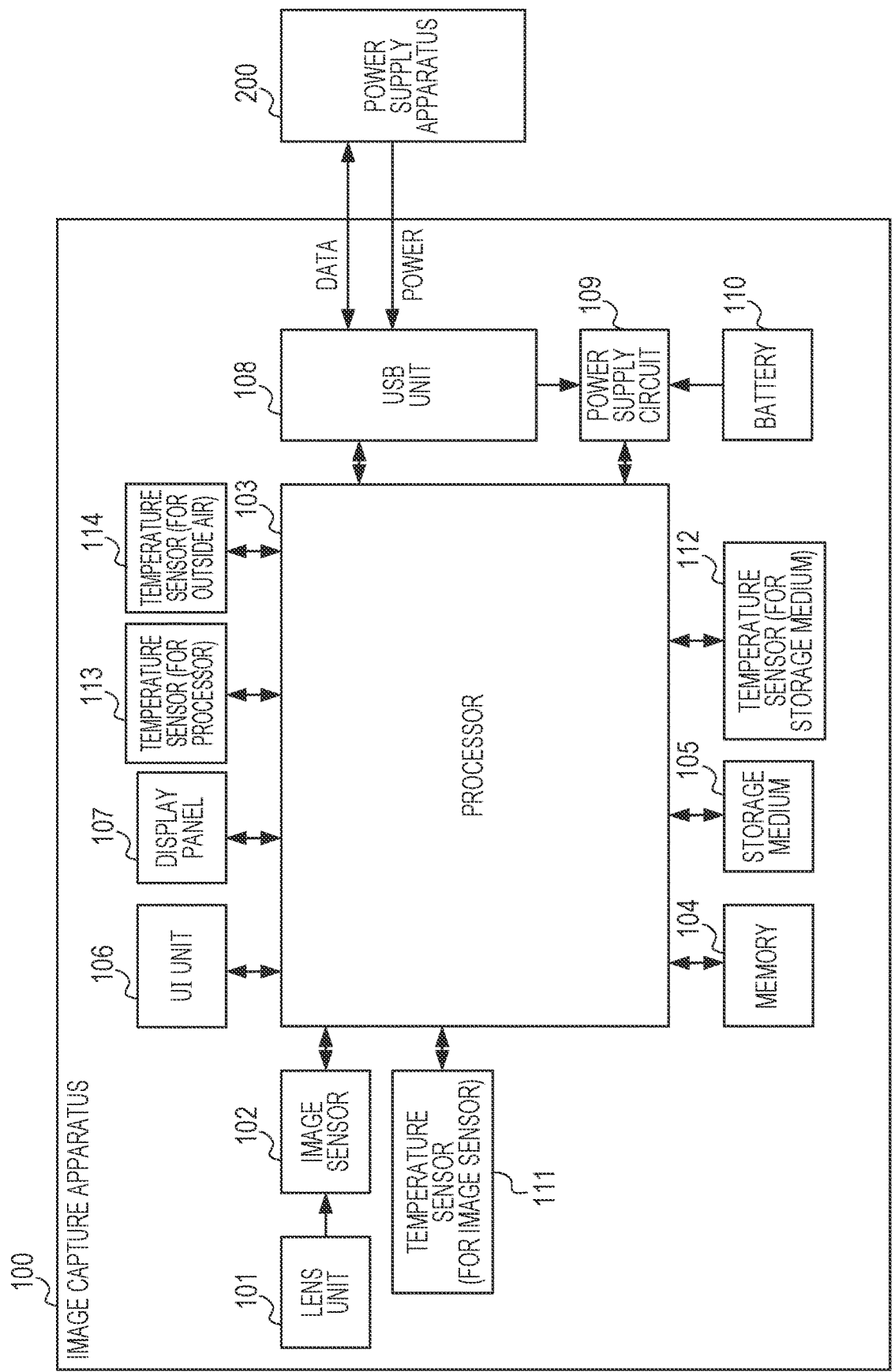
FIG. 1 is a block diagram for illustrating exemplary components of an image capture apparatus 100.

FIG. 1 is a block diagram for illustrating exemplary components of an image capture apparatus 100. The image capture apparatus 100 is an apparatus capable of acting as a digital camera or a digital video camera. The image capture apparatus 100 may be a smartphone, a tablet, an industrial camera, a medical camera, or the like.

A lens unit 101 forms an optical image of a subject on an imaging surface of an image sensor 102. The image sensor 102 generates image data from the optical image formed on the imaging surface. A processor 103 performs a predetermined image process and a predetermined coding process to process the image data generated by the image sensor 102. The image data processed by the processor 103 is recorded in a storage medium 105, and is displayed on a display panel 107. Furthermore, the processor 103 executes a program stored in memory 104 to control each component of the image capture apparatus 100. A USB unit 108 is compliant with USB specification, USB Type-C specification, USB PD specification, or the like.

The memory 104 is memory that stores a program for controlling each component of the image capture apparatus 100. The memory 104 is memory that also stores various types of information and data used by the processor 103. For example, power consumption information for each operating mode, operating mode information, and image data for notifying the user of the state of the image capture apparatus 100 are stored in the memory 104. The storage medium 105 is a storage medium (such as a memory card) that stores image data coded by the processor 103. A UI (user interface) unit 106 is a user interface for the user to operate the image capture apparatus 100. The display panel 107 is a display unit that performs display for checking a to-be-captured image, that performs display for playing and checking a captured image, and that displays the operating mode of the image capture apparatus 100. A battery 110 is a power source (such as a lithium ion battery) that supplies power for the image capture apparatus 100 to operate.

Figure 2:
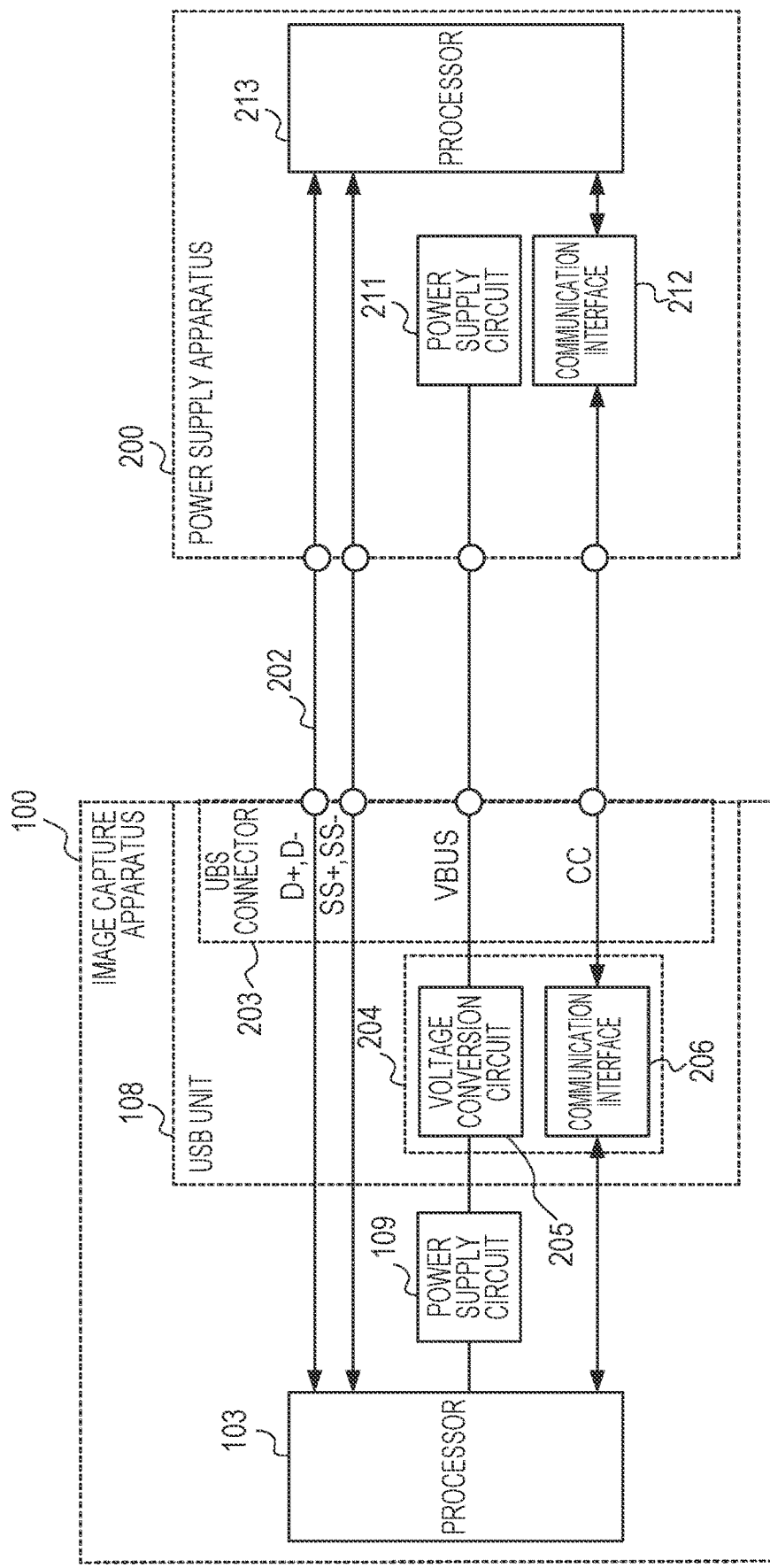
FIG. 2 is a block diagram for illustrating exemplary components of a USB unit 108.

A power supply circuit 109 converts voltage supplied from the battery 110 or the USB unit 108 to voltage used by each element, such as the lens unit 101, the image sensor 102, and the processor 103. As illustrated in FIG. 2, the USB unit 108 is connected to a power supply apparatus 200 (such as a personal computer) with a USB cable 202 interposed therebetween, and transfers image data recorded in the storage medium 105 to the power supply apparatus 200.

Temperature sensors 111 to 114 are thermistors, for example, and are connected to the processor 103 to detect the temperature of each element. The temperature sensor 111 is a temperature sensor for detecting the temperature of the image sensor 102. The temperature sensor 112 is a temperature sensor for detecting the temperature of the storage medium 105. The temperature sensor 113 is a temperature sensor for detecting the temperature of the processor 103. The temperature sensor 114 is a temperature sensor for detecting a temperature of the outside air.

The image capture apparatus 100 has operating modes, such as the "image capture mode" of capturing an image (a still image or a moving image), the "play mode" of playing a captured image, and the "data transfer mode" of transferring data saved in the storage medium 105 to the power supply apparatus 200. In the first embodiment, the memory 104 stores in advance power consumption information for each operating mode of the image capture apparatus 100. In addition, the operative temperature condition of the image sensor 102 is defined. The memory 104 stores in advance the operative temperature condition of the image sensor 102.

The processor 103 obtains the temperature of the image sensor 102, detected by the temperature sensor 111, and calculates a temperature margin until an operation stop on the basis of the difference between the maximum operative temperature of the image sensor 102, which is stored in advance in the memory 104, and the detected temperature of the image sensor 102.

Next, with reference to FIG. 2, exemplary components of the USB unit 108 will be described. The image capture apparatus 100 is connected to the power supply apparatus 200 with the USB cable 202 interposed therebetween. The USB unit 108 includes a USB connector 203 and a power receiving circuit 204. The power receiving circuit 204 includes a voltage conversion circuit 205 and a communication interface 206. The power supply apparatus 200 includes a power supply circuit 211, a communication interface 212, and a processor 213.

The USB connector 203 is a connector connected to the USB cable 202. The USB connector 203 has a D+/D− terminal and an SS+/SS− terminal for data communication lines, a GND terminal for ground signals, a VBUS terminal for a power supply line, a CC (configuration channel) terminal, or the like. The CC terminal is a terminal that is compliant with the USB Type-C specification and the USB PD specification, and that is used for negotiation on power supply compliant with the USB PD specification.

The voltage conversion circuit 205 converts voltage supplied from the power supply circuit 211 of the power supply apparatus 200 via the VBUS terminal of the USB connector 203 to system voltage of the image capture apparatus 100, and supplies the system voltage to the power supply circuit 109. The power supply circuit 109 converts the system voltage to voltage used by each element.

The communication interface 206 is connected to the communication interface 212 of the power supply apparatus 200 via the CC terminal of the USB connector 203. The communication interface 206 performs negotiation between the image capture apparatus 100 and the power supply apparatus 200 under control of the processor 103.

When USB standard power is supplied, the power supply circuit 211 in the power supply apparatus 200 supplies power of (5 V, 500 mA) to the voltage conversion circuit 205 in the image capture apparatus 100 via the VBUS terminal. In contrast, when power compliant with USB PD is supplied, the power supply circuit 211 in the power supply apparatus 200 is able to supply power from 10 W (5 V, 2 A) to 100 W (20 V, 5 A) to the voltage conversion circuit 205 in the image capture apparatus 100 via the VBUS terminal.

Next, a process up to the start of power supply compliant with the USB PD specification will be described. When connected with the power supply apparatus 200 via USB, the image capture apparatus 100 detects the voltage of the CC terminal, which is determined by a pull-down resistance (not illustrated) in the image capture apparatus 100 and a pull-up resistance (not illustrated) in the power supply apparatus 200. On the basis of the voltage of the CC terminal, the image capture apparatus 100 determines whether the power supply apparatus 200 is an apparatus that supplies standard power (such as 5 V, 500 mA) compliant with the USB specification. In the case where the power supply apparatus 200 is an apparatus that supplies standard power compliant with the USB specification, the image capture apparatus 100 is activated with standard power compliant with the USB specification. Next, the image capture apparatus 100 negotiates with the power supply apparatus 200 on power supply compliant with the USB PD specification via the CC terminal, and sets a combination of supply voltage and supply current. For example, the image capture apparatus 100 (Consumer) requests the power supply apparatus 200 (Provider) of a supply capability(ies) compliant with the USB PD specification (a combination(s) of voltage and current that the power supply apparatus 200 can supply). Next, the power supply apparatus 200 returns a supply capability(ies) compliant with the USB PD specification to the image capture apparatus 100. In the case where the image capture apparatus 100 determines that there is a combination of desired voltage and current among the supply capability(ies) returned from the power supply apparatus 200, the image capture apparatus 100 sends supply power setting information indicating the combination of desired voltage and current to the power supply apparatus 200. Then, the power supply apparatus 200 performs a step-up process or step-down process using the power supply circuit 211 on the basis of the received supply power setting information, and supplies the desired power to the image capture apparatus 100 via the VBUS terminal. In addition, in the case where the processor 103 determines that there is no combination of desired voltage and current among the supply capabilities returned from the power supply apparatus 200, power supply compliant with the USB PD specification is stopped.

As described above, the image capture apparatus 100 is able to set supply voltage compliant with the USB PD specification by communicating with the power supply apparatus 200. The supply voltage is, for example, 5 V, 9 V, 12 V, 15 V, etc. The voltage conversion circuit 205 converts power supplied from the power supply apparatus 200 to system voltage necessary for system operation. For example, in the case where the image capture apparatus 100 operates using a 2-cell lithium-ion battery as a power source, the voltage conversion circuit 205 generally converts the power to a system voltage of around 8.4 V. In addition, in the case where the image capture apparatus 100 operates using a 4-cell lithium-ion battery as a power source, the voltage conversion circuit 205 generally converts the power to a system voltage of around 16.8 V. The image capture apparatus 100 is required to be reduced in size and to have higher functionality. As a result, the power density per volume has been increasing steadily.

Next, with reference to FIG. 7, an exemplary conversion efficiency of the voltage conversion circuit 205 converting supply voltage compliant with the USB PD specification to a 4-cell lithium ion battery voltage (such as 16.8 V) will be described. The voltage conversion circuit 205 includes a step-down circuit and a step-up circuit. Generally, the voltage conversion circuit 205 is such that a step-up circuit that boosts voltage has a larger conversion loss than a step-down circuit that lowers voltage. In addition, the voltage conversion circuit 205 includes a step-up/step-down circuit. The step-up/step-down circuit operates switchably between stepping-down and stepping-up in response to an input voltage or a load current. A conversion loss of the step-up/step-down circuit is between conversion losses of the step-down circuit and the step-up circuit. In addition, the efficiency of the voltage conversion circuit 205 deteriorates more as the voltage difference between an input voltage and an output voltage becomes greater.

The voltage conversion circuit 205 generates heat due to a voltage conversion loss. As the voltage conversion loss of the voltage conversion circuit 205 increases, the internal temperature of the image capture apparatus 100 increases, and the processor 103 or the image sensor 102 may stop operating. Here, the voltage conversion circuit 205 may reduce the conversion loss by receiving, from the power supply apparatus 200, power that is as close to the system voltage as possible and that is higher than the system voltage. However, when the supply voltage is limited to one that minimizes the conversion loss of the voltage conversion circuit 205, there is a problem that the power supply apparatus 200 is limited and becomes less versatile. Hereinafter, a method of reducing the conversion loss of the voltage conversion circuit 205 will be described.

Figure 3:
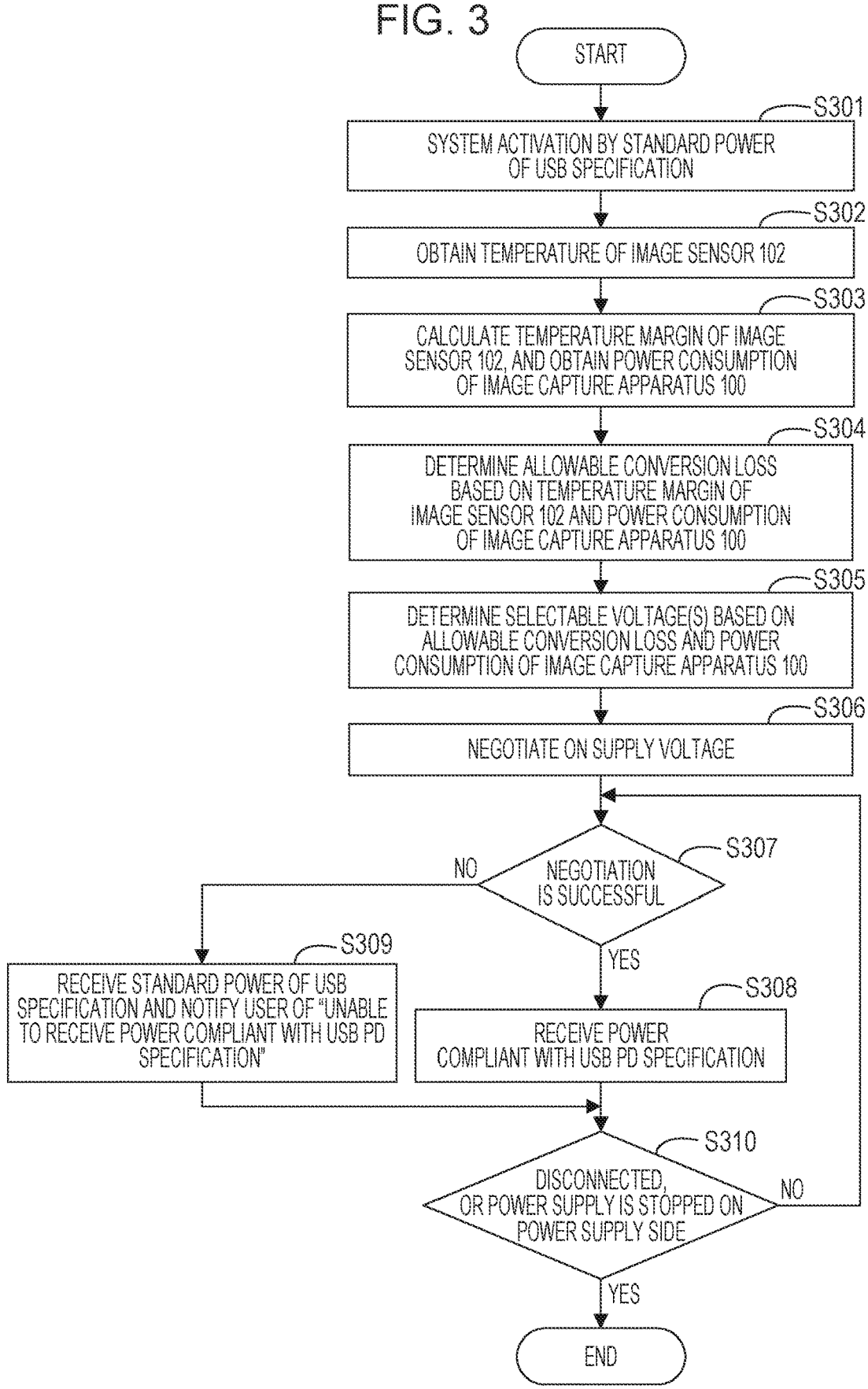
FIG. 3 is a flowchart for illustrating a first supply voltage selecting method.

Next, with reference to the flowchart illustrated in FIG. 3, a first supply voltage selecting method performed by the image capture apparatus 100 will be described. The first supply voltage selecting method is controlled by the processor 103. The flowchart illustrated in FIG. 3 is started when, after the processor 103 is activated, the processor 103 detects a USB connection between the power supply apparatus 200 and the image capture apparatus 100.

In step S301, the processor 103 activates the image capture apparatus 100 using power (corresponding to standard power compliant with the USB specification) supplied from the power supply apparatus 200.

In step S302, the processor 103 obtains the temperature of the image sensor 102, detected by the temperature sensor 111.

In step S303, the processor 103 calculates the difference between the obtained temperature of the image sensor 102 and the maximum operative temperature of the image sensor 102, which is stored in advance in the memory 104. On the basis of the difference, the processor 103 calculates the temperature margin of the image sensor 102 until the image capture apparatus 100 stops operating. The processor 103 refers to a power consumption table stored in advance in the memory 104, and obtains power consumption according to the operating mode of the image capture apparatus 100.

In step S304, the processor 103 refers to an allowable conversion loss table stored in advance in the memory 104, and determines an allowable conversion loss on the basis of the temperature margin of the image sensor 102 and the power consumption of the image capture apparatus 100, which are obtained in step S303.

Referring to FIG. 5, an exemplary allowable conversion loss table will be described. For example, when the temperature of the image sensor 102 is 60° C. and the maximum operative temperature stored in advance in the memory 104 is 75° C., the temperature margin is −15° C. The processor 103 refers to the allowable conversion loss table illustrated in FIG. 5, and, when the temperature margin is −15° C. and the power consumption of the image capture apparatus 100 is 10 W, the processor 103 determines an allowable conversion loss of "8 W".

In step S305, the processor 103 refers to a conversion loss table stored in advance in the memory 104, and determines a selectable supply voltage(s) on the basis of the allowable conversion loss determined in step S304 and the power consumption of the image capture apparatus 100. The processor 103 determines one or more voltages among voltages compliant with the USB PD specification.

Referring to FIG. 6, an exemplary conversion loss table will be described. For example, when the power consumption of the image capture apparatus 100 is "10 W" and the allowable conversion loss is "8 W", the processor 103 determines the supply voltages "9 V, 12 V, and 20 V" where conversion losses are less than or equal to "8 W". When the supply voltage is "9 V, 12 V, or 20 V", the conversion loss is less than or equal to the allowable conversion loss of "8 W". When the supply voltage is 5 V, the voltage conversion loss of "8.2 W" exceeds the allowable conversion loss of "8 W", and therefore, the supply voltage of "5 V" is not included in the selectable supply voltage(s).

In step S306, the processor 103 negotiates with the power supply apparatus 200 on power supply compliant with the USB PD specification via the communication interface 206 using the selectable supply voltage(s) determined in step S305.

In the case where the power supply negotiation is successful in step S307, the processor 103 proceeds to step S308 (YES in step S307). In the case where the power supply negotiation is unsuccessful, the processor 103 proceeds to step S309 (NO in step S307).

In step S308, the processor 103 starts reception of power that is a combination of voltage and current supplied by the power supply apparatus 200 as a result of the power supply negotiation, and proceeds to step S310.

In step S309, the processor 103 continues reception of power (corresponding to standard power compliant with the USB specification) supplied by the power supply apparatus 200. The processor 103 notifies the user by displaying the message "Unable to receive power compliant with the USB PD specification" on the display panel 107, and proceeds to step S310.

In step S310, in the case where neither disconnection of the USB connection between the power supply apparatus 200 and the image capture apparatus 100 or stopping of power supply from the power supply apparatus 200 is detected, the processor 103 returns to step S307 (NO in step S310). In response to detection of disconnection of the USB connection between the power supply apparatus 200 and the image capture apparatus 100 or detection of stopping of power supply from the power supply apparatus 200, the processor 103 ends the flowchart illustrated in FIG. 3 (YES in step S310).

Note that step S301 and step S302 are not limited to the above processes. After the system activation of the image capture apparatus 100, the processor 103 may obtain the temperature of the image sensor 102, detected by the temperature sensor 111, in a certain cycle, irrespective of detection of a USB connection between the power supply apparatus 200 and the image capture apparatus 100.

In addition, in step S302, the temperature obtained by the processor 103 is not limited to the temperature of the image sensor 102. The processor 103 may obtain the temperature of the image capture apparatus 100 such as the temperature of the air outside the image capture apparatus 100, the temperature of the processor 103, the temperature of the storage medium 105, the temperature of an internal substrate of the image capture apparatus 100, or the temperature of a housing of the image capture apparatus 100.

As described above, in step S304 and step S305, the processor 103 determines a selectable supply voltage(s) in accordance with the temperature of the image capture apparatus 100 and the power consumption of the image capture apparatus 100 in order to avoid an operation stop of the image capture apparatus 100. When it is highly likely that the operation of the image capture apparatus 100 stops, the processor 103 limits the selectable supply voltage(s). In doing so, the voltage conversion circuit 205 may have a reduced loss in conversion from supply voltage compliant with the USB PD specification to system operation voltage, which may suppress a stop of operation of the image capture apparatus 100. When it is less likely that the operation of the image capture apparatus 100 stops, the processor 103 may expand the selectable supply voltage(s).

Note that embodiments of the present invention are not limited to the above-described first embodiment. The first embodiment that is changed or modified without departing from aspects of the present invention is also included in the embodiments of the present invention.

Second Embodiment

The components of the image capture apparatus 100 in a second embodiment are the same as the components of the image capture apparatus 100 in the first embodiment, and therefore, descriptions of these components will be omitted.

Figure 4:
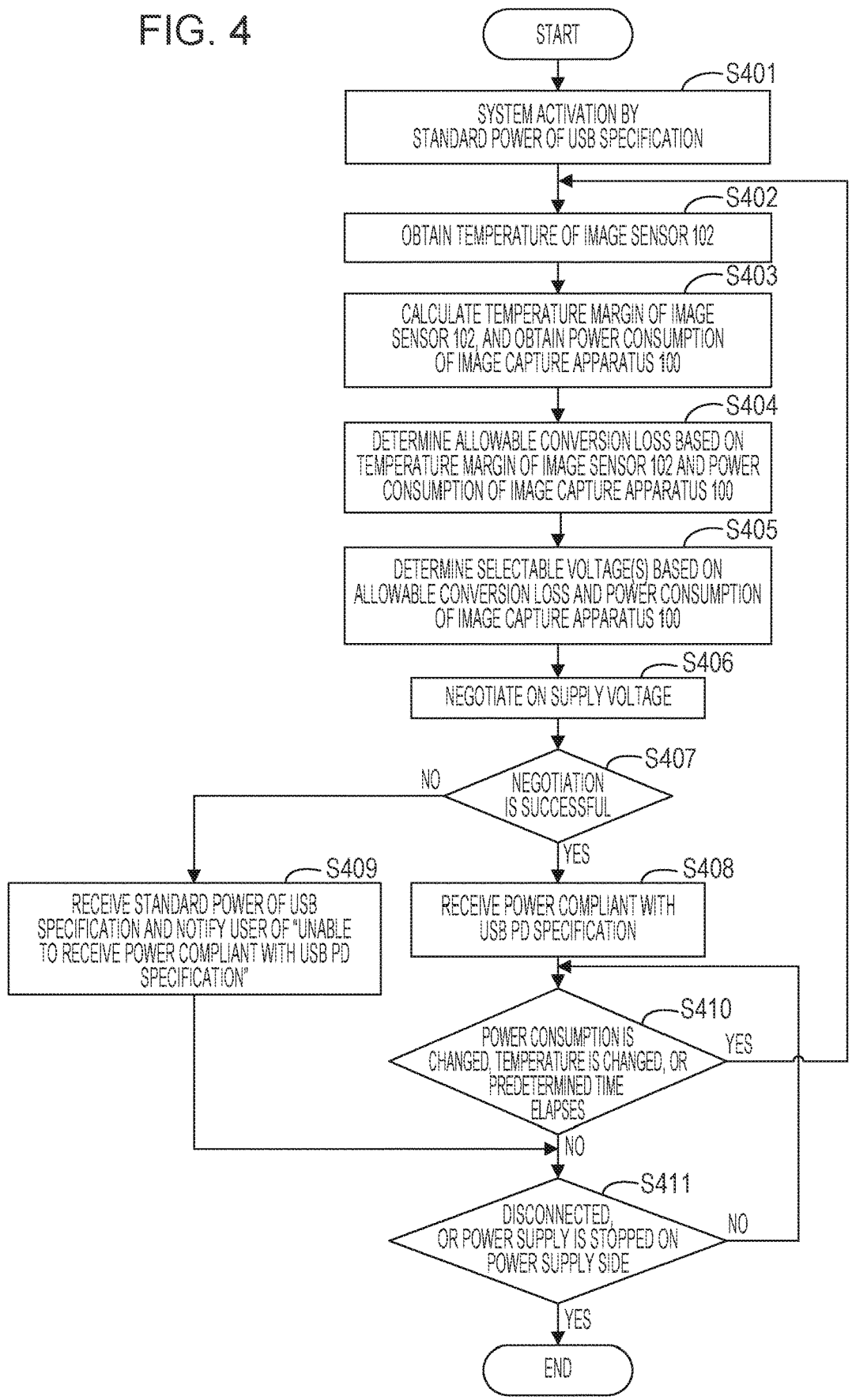
FIG. 4 is a flowchart for illustrating a second supply voltage selecting method.

FIG. 4 is a flowchart for illustrating a second supply voltage selecting method performed by the image capture apparatus 100 in the second embodiment. Since steps S401 to S409 in FIG. 4 are the same as steps S301 to S309 in FIG. 3, descriptions of these steps are omitted. Note that the processor 103 proceeds to step S410 after step S408, and proceeds to step S411 after step S409.

In step S410, the processor 103 obtains the power consumption of the image capture apparatus 100, the temperature of the image sensor 102, and the time of a timer. In the case where any of a change in the power consumption of the image capture apparatus 100 that is greater than or equal to a first threshold, a change in the temperature of the image sensor 102 that is greater than or equal to a second threshold, and the elapse of a predetermined time of the timer is detected, the processor 103 returns to step S402 (YES in step S410). Accordingly, even in the case where the power consumption of the image capture apparatus 100 or the temperature of the image sensor 102 does not change, the processor 103 returns to step S402 from step S410 at predetermined time intervals.

In the case where none of a change in the power consumption of the image capture apparatus 100 that is greater than or equal to the first threshold, a change in the temperature of the image sensor 102 that is greater than or equal to the second threshold, and the elapse of the predetermined time of the timer is detected, the processor 103 proceeds to step S411 (NO in step S410).

In step S411, in the case where neither disconnection of the USB connection between the power supply apparatus 200 and the image capture apparatus 100 or stopping of power supply from the power supply apparatus 200 is detected, the processor 103 returns to step S410 (NO in step S411). In response to disconnection of the USB connection between the power supply apparatus 200 and the image capture apparatus 100 or detection of stopping of power supply from the power supply apparatus 200, the processor 103 ends the flowchart illustrated in FIG. 4 (YES in step S411).

According to the second embodiment, in the case where the power consumption of the image capture apparatus 100 increases or decreases or the temperature of the image sensor 102 increases or decreases during the operation of the image capture apparatus 100, the processor 103 may reset the selectable supply (s).

Although the temperature of the image sensor 102 serves as a target in the second embodiment, the target temperature is not limited to the temperature of the image sensor 102. For example, the target temperature may be the temperature of the image capture apparatus 100 such as the temperature of the air outside the image capture apparatus 100, the temperature of the processor 103, the temperature of the storage medium 105, the temperature of the internal substrate of the image capture apparatus 100, or the temperature of the housing of the image capture apparatus 100.

Note that embodiments of the present invention are not limited to the above-described second embodiment. The above-described second embodiment that is changed or modified without departing from aspects of the present invention is also included in the embodiments of the present invention.

Third Embodiment

Various functions, processes, or methods described in the first and second embodiments may be implemented by a personal computer, a microcomputer, a CPU (central processing unit), a processor, or the like using a program. Hereinafter, a personal computer, a microcomputer, a CPU (central processing unit), a processor, or the like will be referred to as a "computer X" in a third embodiment. In addition, a program for controlling the computer X and for implementing various functions, processes, or methods described in the first and second embodiments will be referred to as a "program Y" in the third embodiment.

Various functions, processes, or methods described in the first and second embodiments are implemented by the computer X executing the program Y. In this case, the program Y is supplied to the computer X via a computer-readable storage medium. A computer-readable storage medium in the third embodiment includes at least one of a hard disk drive, a magnetic storage device, an optical storage device, a magneto-optical storage device, a memory card, volatile memory, and non-volatile memory. A computer-readable storage medium in the third embodiment is a non-transitory storage medium.

While aspects of the present invention are described with reference to exemplary embodiments, it is to be understood that the aspects of the present invention are not limited to the exemplary embodiments. The scope of the following claims is to be accorded the broadest interpretation so as to encompass all modifications and equivalent structures.

The invention claimed is:

1. An image capture apparatus comprising:
a CPU; and
a memory storing a program which, when executed by the CPU, causes the image capture apparatus to function as:
a determination unit that performs a determination of voltage to be requested to a power supply apparatus connected to the image capture apparatus based on a temperature of the image capture apparatus and power consumption of the image capture apparatus;
a communication unit that sends a request for the determined voltage to the power supply apparatus; and
a power receiving unit that receives the requested power supplied from the power supply apparatus to the image capture apparatus after the request for the determined voltage is sent to the power supply apparatus,
wherein the determination unit performs the determination and the communication unit sends the request to the power supply apparatus, in a case where a change greater than or equal to a first threshold is detected in power consumption of the image capture apparatus,
wherein the determination unit performs the determination and the communication unit sends the request to the power supply apparatus, in a case where a change greater than or equal to a second threshold is detected in a temperature of the image capture apparatus, and
wherein the determination unit performs the determination at predetermined time intervals and the communication unit sends the request to the power supply apparatus, in a case where the change in the power consumption and the change in the temperature are not detected for a predetermined time period.

2. The image capture apparatus according to claim 1, wherein the determination unit performs the determinatio the voltage to be requested to the power supply apparatus based on a difference between a maximum operative temperature of the image capture apparatus and a temperature of the image capture apparatus.

3. The image capture apparatus according to claim 1, wherein the temperature of the image capture apparatus is any one of: a temperature of an image sensor, a temperature of a processor, a temperature of a storage medium, a temperature outside a housing of the image capture apparatus, and a temperature inside the housing of the image capture apparatus.

4. The image capture apparatus according to claim 1, wherein the communication unit and the power receiving unit are compliant with a USB Power Delivery (USBPD) specification.

5. A method comprising:
performing a determination of voltage to be required to a power supply apparatus connected to an image capture apparatus, based on a temperature of the image capture apparatus and power consumption of the image capture apparatus;
sending a request for the determined voltage to the power supply apparatus; and
receiving the requested power supplied from the power supply apparatus to the image capture apparatus after the request for the determined voltage is sent to the power supply apparatus,
wherein the performing performs the determination and the sending sends the request to the power supply apparatus, in a case where a change greater than or equal to a first threshold is detected in power consumption of the image capture apparatus,
wherein the performing performs the determination and the sending sends the request to the power supply apparatus, in a case where a change greater than or equal to a second threshold is detected in a temperature of the image capture apparatus, and
wherein the performing performs the determination at predetermined time intervals and the sending sends the request to the power supply apparatus, in a case where the change in the power consumption and the change in the temperature are not detected for a predetermined time period.

* * * * *